United States Patent
Bauer et al.

(10) Patent No.: US 10,610,341 B2
(45) Date of Patent: Apr. 7, 2020

(54) MORE EFFICIENT METHOD FOR PRODUCING THREE-DIMENSIONAL OBJECTS BY MEANS OF A RAPID PROTOTYPING PROCESS

(71) Applicant: HERAEUS KULZER GMBH, Hanau (DE)

(72) Inventors: Christian Bauer, Schöllkrippen (DE); Yohannes Woldegergis, Hanau (DE); Uwe Brick, Jena (DE)

(73) Assignee: HERAEUS KULZER GMBH, Hanau (DE)

( * ) Notice: Subject to any disclaimer, the term of this patent is extended or adjusted under 35 U.S.C. 154(b) by 327 days.

(21) Appl. No.: 15/320,020

(22) PCT Filed: Jun. 17, 2015

(86) PCT No.: PCT/EP2015/063567
§ 371 (c)(1),
(2) Date: Dec. 19, 2016

(87) PCT Pub. No.: WO2015/193360
PCT Pub. Date: Dec. 23, 2015

(65) Prior Publication Data
US 2017/0246796 A1    Aug. 31, 2017

(30) Foreign Application Priority Data

Jun. 18, 2014 (DE) .................. 10 2014 108 634

(51) Int. Cl.
*B33Y 30/00* (2015.01)
*B29C 64/124* (2017.01)
(Continued)

(52) U.S. Cl.
CPC .......... *A61C 19/003* (2013.01); *B29C 64/124* (2017.08); *B29C 64/129* (2017.08);
(Continued)

(58) Field of Classification Search
CPC ......... B33Y 10/00; B33Y 80/00; B33Y 50/02; B33Y 30/00; B29C 64/124; B29C 64/20;
(Continued)

(56) References Cited

U.S. PATENT DOCUMENTS

| 5,665,401 A | 9/1997 | Serbin et al. |
|---|---|---|
| 5,904,889 A | 5/1999 | Serbin et al. |

(Continued)

FOREIGN PATENT DOCUMENTS

| DE | 89 16 227 U1 | 8/1995 |
|---|---|---|
| DE | 44 14 775 A1 | 10/1995 |

(Continued)

*Primary Examiner* — Nahida Sultana
*Assistant Examiner* — Debjani Roy
(74) *Attorney, Agent, or Firm* — Norris McLaughlin, P.A.

(57) ABSTRACT

The invention relates to a device and a method for the production of three-dimensional objects, in particular of at least parts of dental prosthetic restorations, by a stripping device wiping off plastic material, which protrudes vertically beyond a container, into a collecting container and forms a projection surface. According to the invention, a stripping device and a light source are coupled and simultaneously guided, at a defined distance, across the liquid light-curing plastic material, whereby the stripping device is guided at a defined distance right ahead of the light source and forms the projection surface for the illuminated field of the light source.

6 Claims, 5 Drawing Sheets

Figure 1:
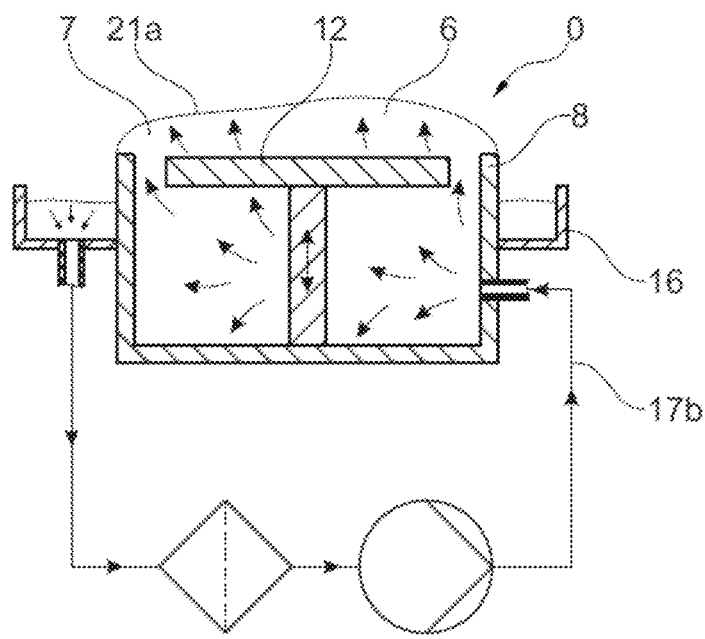

(51) Int. Cl.
*B29C 64/20* (2017.01)
*B29C 64/129* (2017.01)
*B33Y 10/00* (2015.01)
*B33Y 50/02* (2015.01)
*B29C 64/386* (2017.01)
*B33Y 80/00* (2015.01)
*A61C 13/15* (2006.01)
*B29C 64/40* (2017.01)

(52) U.S. Cl.
CPC ............ *B29C 64/20* (2017.08); *B29C 64/386* (2017.08); *B29C 64/40* (2017.08); *B33Y 10/00* (2014.12); *B33Y 30/00* (2014.12); *B33Y 50/02* (2014.12); *B33Y 80/00* (2014.12)

(58) Field of Classification Search
CPC ..... B29C 64/129; B29C 64/40; A61C 19/003; G05B 19/042
See application file for complete search history.

(56) References Cited

U.S. PATENT DOCUMENTS

| | | | |
|---|---|---|---|
| 6,051,179 A * | 4/2000 | Hagenau | B33Y 30/00 264/401 |
| 7,783,371 B2 | 8/2010 | John et al. | |
| 8,126,580 B2 | 2/2012 | El-Siblani et al. | |
| 2007/0284547 A1* | 12/2007 | Sejersen | B41J 2/442 250/503.1 |
| 2008/0038396 A1 | 2/2008 | John et al. | |
| 2008/0113293 A1 | 5/2008 | Shkolnik et al. | |
| 2010/0152873 A1 | 6/2010 | Dunne et al. | |
| 2010/0249979 A1 | 9/2010 | John et al. | |
| 2014/0052288 A1* | 2/2014 | El-Siblani | G05B 19/042 700/119 |

FOREIGN PATENT DOCUMENTS

| | | | | |
|---|---|---|---|---|
| DE | 4414775 A1 * | 10/1995 | | G03F 7/0037 |
| DE | 195 15 165 A1 | 10/1996 | | |
| EP | 1 894 705 A2 | 3/2008 | | |
| EP | 1 982 824 A2 | 10/2008 | | |
| EP | 1 880 830 B1 | 12/2011 | | |

* cited by examiner 14a    14 b    14c    14d    14e    14f

5    Figure 7d

MORE EFFICIENT METHOD FOR PRODUCING THREE-DIMENSIONAL OBJECTS BY MEANS OF A RAPID PROTOTYPING PROCESS

This application is a 371 of PCT/EP2015/063567, filed Jun. 17, 2015, which claims foreign priority benefit under 35 U.S.C. § 119 of German Patent Application No. 10 2014 108 634.1, filed Jun. 18, 2014, the disclosures of which are incorporated herein by reference.

The invention relates to a device and a method for the production of three-dimensional objects, in particular of at least parts of dental prosthetic restorations, by a stripping device wiping off plastic material, which protrudes vertically beyond a container, into a collecting container and forms a projection surface. According to the invention, a stripping device and a light source are coupled and simultaneously guided, at a defined distance, across the liquid light-curing plastic material, whereby the stripping device is guided at a defined distance right ahead of the light source and forms the projection surface for the illuminated field of the light source. The invention also relates to a method for producing a homogenised distribution of light intensity with a spatial light modulator and to a rapid prototyping method using a method of this type.

Rapid prototyping methods include stereolithography methods. Rapid prototyping methods are three-dimensional printing processes. Presently, light-polymerisable (curable) monomers or compositions comprising a mixture of monomers are polymerised, preferably with UV light. Based on a 3-D model in STL format, the 3-D model may be provided with a supporting construct, also called support, in order to increase the stability on the building platform in the bath. The model thus obtained is subsequently subdivided into individual slices by digital means in a process called slicing. The individual layers are read-out into a machine control and then adapted accordingly in the machine control The machine control regulates the sequence of motions and the illumination procedure.

Likewise, a method is known from the prior art, in which the laser (laser illumination method) is projected across the projection surface of the polymerisable resin by means of a mobile mirror. Usually, the contours of the three-dimensional object are illuminated first followed by the surfaces of the object that is subdivided into layers. The method is a static method, in which the illumination takes place point-by-point. Therefore, the method is very time-consuming.

In a DLP method, a surface is being irradiated by means of a DLP chip (digital light processing, a micro-mirror reactor) with LED technology and 0.5 to 100 Watts of optical power. The DLP method is also only known as a static method. The light source is not moved during the illumination phase (static) and illuminates, in still images, resin layers yet to be polymerised.

In the known methods, the surface is stripped with a scraper. The illumination process takes place afterwards, after some waiting time. After the illumination, the surface is subjected to the scraper again. This is made necessary by the currently known designs of RP printers.

Known rapid prototyping methods involve the use of ultraviolet (UV) lasers and, increasingly, of UV-LED data projectors. Methods for this purpose are known, for example, from EP 1880830 A1 and EP 1894705 A2. Lasers are disadvantageous due to their illuminated field being punctiform. The UV light of the light source is projected onto a light-curing plastic material as the illuminated field. The projection involves the use of an optical system and a spatial light modulator. Due to the optical system, the distribution of light and/or the intensity distribution is inhomogeneous. The peripheral regions of the illuminated field typically show lower intensity than the regions in the centre of the illuminated field. Due to this effect, also called barrel image, the light-curing plastic material does not receive the same intensity in all places, which causes it to cure differently, i.e. inhomogeneously.

EP 1 982 824 A2 proposes to homogenise the intensity distribution by reducing the brighter pixels of the UV data projector to the intensity level of the pixels on the periphery by means of a grey distribution.

This is disadvantageous in that the grey distribution can be attained only through accurate control of the intensity. It is therefore also an object of the invention to provide a simpler method that can be used to attain a similar effect.

The object of the invention was to drastically reduce the construction times through little design effort in order to render the process more economical. Accordingly, the object was to develop a device and a method that can be used to print three-dimensional form bodies in shorter construction times as compared to the known static methods. It was another object of the invention to be able to provide a constant level with respect to the z-axis of polymerisable material, such as a composition comprising monomers, with little design effort and without any need for further positioning devices or measuring facilities. Moreover, the object was to enable a constant filling height level regulation. Specifically, a simpler method is to provided that attains, in particular, a satisfactory homogenisation of the light intensity of the illuminated field. The method shall be implementable as inexpensively as possible.

The objects of the invention are met by a device according to claim 1 as well as a method according to claim 9, in which the light-curing plastic material is polymerised by means of a light source, whereby a stripping device is guided at a defined distance ahead of the light source and allows for simultaneous generation of the planar projection surface and guidance of the illuminated field of the light source in one procedural step and/or one passage. One passage shall be understood to be the path length travelled by the light source from one reversal point of one side of the container of the device to the reversal point on the opposite side of the container. The light-curing plastic material preferably is a composition comprising electromagnetic radiation-polymerisable monomers, preferably dental UV-polymerisable monomers.

According to the invention, the smoothing with the doctor plate and the illumination take place basically in one procedural step at the same time, as shall be illustrated below. According to the invention, the stripping device and the illumination field are situated at a distance of just a few millimetres. This measure allowed the construction time to be reduced significantly.

The subject matter of the invention is a device comprising, in particular, an assembly with a light source, preferably for producing a homogenised distribution of light intensity, for producing a three-dimensional object by illuminating a liquid light-curing plastic material, having a container for accommodation of a bath of the light-curing liquid plastic material, having a building platform for positioning the object relative to the surface (z-axis) of the bath, whereby the light source and a stripping device can be coupled, in particular can be mechanically and/or magnetically coupled, and the stripping device is arranged in front of the illumination field of the light source and/or in front of the light source with, in particular, the stripping device being guided simultaneously and together with the illumination field of the light source ahead of the illumination field along an axis of the container by means of a coupling device and a coupling element.

Preferably, the light source or an assembly comprising the light source is assigned to a motor that drives the assembly or light source. Preferably, the stripping device is also directly driven and moved along an axis of the container through said drive. The light source and/or the illuminated field and the stripping device are situated at a distance of approximately 20 to 150 mm, preferably 20 to 80 mm, relative to the x,y plane, from each other According to a particularly preferred embodiment, said assembly 0 comprises the light source and can be coupled to the stripping device and forms an entire assembly 0#. In this context, it is also preferred for the stripping device to comprise a coupling device and to be assigned to the light source or a coupling element, in particular a kind of sword, to be assigned to the assembly. Alternatively, a coupling element can be assigned to the stripping device and a coupling device can be assigned to the light source or assembly. In this context, it can be preferred just as well to have the coupling element be provided with a motor for driving. According to the invention, the drivable light source, assembly or entire assembly is driven by a motor. According to a particularly preferred embodiment of the invention, the stripping device can be guided simultaneously and together with the drivable light source ahead of the illuminated field of the light source, along an axis of the container (x,y plane), whereby a drive is assigned to the light source, assembly or entire assembly.

According to the invention, it is preferred for the coupling element to engage the coupling device in detachable manner. It is further preferred in this context for the coupling element to be provided in a form-fitting manner with respect to the coupling device. Preferably, the coupling element and the coupling device can act in concert by means of a form fit. In this context, the coupling element can take the shape of a polygon, such as a hexagon, or form a flat element with two pointed lateral regions that can be guided through or slid through between the elements of the coupling device. Further detachable connections known to a person skilled in the art can be formed according to the invention, such as a slip clutch, barrier body clutch, connecting fitting, tongue and groove. In general, the coupling element can be coupled to the coupling device and this can be done in mechanical, such as form-fitting, force-locking or electrical or magnetic manner. Moreover, the coupling element can be pivoted appropriately by means of an axle such that it can be pivoted in the reversal point such that the stripping device is always guided ahead of the illuminated field.

Another subject matter of the invention is a device comprising a coupling device that has at least one element and is assigned to the stripping device, and whereby the upper end of the stripping device is formed to take the shape of an element, whereby said elements are attached against each other by at least one elastic element and at least one fixation, and the coupling element engages the elements laterally in form-fitting manner and can be guided through, with a defined force, between the two elements that are attached by an elastic element and a fixation element in force-locking manner. The coupling mechanism acts in the way of a slip clutch. Preferably, the coupling element is provided such as to be form-fitting with the elements of the coupling device. Accordingly, the coupling element can take the shape of a sword whose geometry is preferably adapted to the cupping device and/or recess A.

Another subject matter of the invention is a device having an attenuator that triggers a guiding-through or sliding-through of the coupling element between the two elements of the coupling device. Preferably, the attenuator is provided in the region of the two lateral reversal points of the pathway of the light source.

It is further preferred in this context to have the drivable stripping device and the light source, in particular the light source of assembly 0, form a drivable assembly 0# having a slip clutch, in particular barrier body clutch.

According to further preferred alternatives, a feeding device for supplying the liquid light-curing plastic material is assigned to the container, with the feeding device, in particular, being assigned to the container below the surface of the bath, whereby the feeding device comprises an exit opening in the container and a pipeline, whereby the pipeline is connected to a pump. Moreover, at least one collecting container is assigned to the container, in particular two opposite collecting containers are assigned to the container in a position lateral to the container, in particular lateral along the longitudinal or transverse axis of the container. The liquid light-curing plastic material, preferably the protruding plastic material having an arched surface, can be transferred into the at least one collecting container by means of a stripping device that can be driven along an axis of the container, preferably in a planar surface. The drivable stripping device preferably comprises a scraper that has a planar underside. The scraper can comprise a rubber lip.

The device according to the invention is designed appropriately such that it is the first to utilise the surface tension of the light-curing plastic material and/or of a polymerisable composition in order to provide an excess of the curable plastic material above the most recently cured layer or above the building platform. Only afterwards, a stripping device, which is fixedly oriented at a defined distance from the upper edge of the container and/or at a height difference of 0.1 mm, is used to render the plastic surface planar.

It is particularly preferred in this context that the liquid light-curing plastic material present in the device, in particular the plastic material that protrudes vertically beyond the walls of the container and has an arched surface due to the surface tension of the plastic material, can be transferred into at least one collecting container by means of a stripping device that can be driven along an axis of the container, in particular a longitudinal or transverse axis, such as a longitudinal centre axis, whereby, in particular, a surface, preferably a planar surface, is formed as projection surface. The stripping device extends essentially transverse across the open region of the container. According to the invention, the stripping device is guided directly along an axis of the container, in particular in a horizontal plane, by means of the drive, advancement and/or propulsion of the light source, assembly or entire assembly. Accordingly, the stripping device according to the invention does not need to have its own electronic drive and/or motor. According to the invention, an electronic motor is assigned to the light source, assembly and/or entire assembly for driving, advancing or propelling them in order to move them across the container.

By means of the device according to the invention, it is feasible to move the stripping device by means of a coupling device and a coupling element simultaneously and together with the illuminated field, but ahead of the illuminated field, along an axis of the container.

Due to the inventive combination of the coupling mechanism and the level regulation, a particularly economically scrolling rapid prototyping method and a device for implementing the method have been provided.

Another subject matter of the invention is a device comprising an assembly (0) that comprises an arrangement, whereby the arrangement comprises a light source, in particular a spatially emitting light source, a spatial light modulator, and an optical system. In this context, it is preferred to have a lens system be the optical system. The light source can be a UV laser or a data projector such as an UV-LED data projector.

According to a further embodiment, a subject matter of the invention is a device having a feeding device that is assigned to the container below the surface of the bath, in particular, the feeding device comprises an exit opening in the container and comprises a pipeline that connects the exit opening and a pump. The exit opening is preferred to be below the bath surface.

Another subject matter of the invention is a device by means of which the liquid light-curing plastic material can be recycled from the collecting container to the bath via the feeding device by means of a suction line, in particular through a filter, by means of a pump, preferably a hose pump, membrane pump. It is particularly important in this context to make sure that there are no bubbles during the feed.

According to a particularly preferred embodiment of the invention, the device comprises an assembly 0#—entire assembly—comprising a stripping device that can be driven along an axis (x,y plane) of the container and a smaller assembly, whereby the stripping device is situated in front of the illuminated field or in front of the light source of the assembly 0. The stripping device is attached at a defined distance in front of the illuminated field or in front of the light source, in particular 20 to 150 mm, preferably 20 to 80 mm. Preferably, the drivable stripping device and the light source of the assembly 0 form an entire assembly 0# that can be coupled and driven. According to a preferred embodiment, the stripping device comprises a coupling device and is pushed ahead of the light source and/or of the illuminated field of the light source by means of a sword that is assigned to the light source or the assembly 0. The sword can preferably be guided, in the region of the reversal points of the assembly on the container on the front and rear end of the container, through a coupling device in order to again position the stripping device in front of the light source or in front of the illuminated field when the entire assembly 0# is driven across the container again along the return path. Due to a sword being assigned to the light source or the assembly 0 and the sword being guided, at the endpoints (reversal points of the assembly 0# in the container), through the coupling device of the stripping device, the coupling element, in particular the sword, can push the coupling device and thus the stripping device ahead of the light source and/or of the illuminated field upon a change of direction of the assembly.

Preferably, the coupling device is a device comprising two elements, in particular trapezoidal elements, preferably symmetrical elements containing at least one trapezoid, that can be pushed against each other by means of springs. The elements are preferably appropriately designed and aligned with respect to each other such that a recess is formed between them in a horizontal plane. The sword can widen the plane to a gap by pushing the two spring-supported elements apart. The sword can be pivoted through said gap in the region of the reversal point in order to be able to again guide the coupling device across the surface of the plastic material in front of the coupling element, such as, for example the sword, when the assembly 0# is being returned. An attenuator is positioned at the reversal points and stops the scraper (wiper, slider) and builds up pressure until the sword becomes pushed through the above-mentioned recess of the coupling device and the gap that is being formed. As soon as the sword is arranged on the opposite side of the coupling device, the assembly 0 can again push the scraper across the container in the opposite direction.

The lower edge(s) of the stripping device is/are adjusted to be at a defined distance with respect to the planar upper edges of the side walls of the container, preferably a distance of, e.g., 0.1 mm can be pre-adjusted. Alternatively, the stripping device can be guided across the planar upper edges of the side walls of the container.

The assembly 0—small assembly—comprises an arrangement comprising a spatially emitting light source, a spatial light modulator as well as the optical system, which is preferred to be a lens system. The light source can comprise an UV laser or a data projector. The data projector can, for example, be a data projector with DLP (Digital Light Processor) technology made by Visitech AS. A micro-mirror reactor is preferred in the DLP technology. Preferably, the optical power of the UV light sources in the range of 0.5 to 100 Watts. Wavelengths from 340 nm to 500 nm are preferred wavelengths.

According to a particularly preferred embodiment of the invention, the stripping device is guided, simultaneously and together with the light source, in front of the illuminated field of the light source along an axis of the container (x, y plane) in order to form the layer (x1, y1) of plastic material to be polymerised as a projection surface onto which the illuminated field is projected and on which the plastic material polymerises due to the illumination in the illuminated field. In the scope of the invention, simultaneous shall be understood to mean simultaneous guiding of the stripping device and light source along an axis of the container. According to the invention, step a), i.e. the level regulation of the bath and generation of the arched surface, preferably takes place at the reversal point of the illumination process and/or in the procedural step, in which the assembly has its reversal point. In this context, it can be preferred for the light source to be driven by means of a motor, in particular an electrical motor.

Another subject matter of the invention is a method for producing a three-dimensional object, in particular of at least one part of a dental prosthetic part, as well as prosthetic parts obtainable according to said method, in which the three-dimensional object, such as a dental prosthetic part, is generated layer-by-layer, by one layer (x1, y1) each being produced as a projection surface of a liquid light-curing plastic material and being polymerised in an illuminated field, at least in part, by light of a light source, preferably of a spatially emitting light source, whereby a) a layer (x1, y1) of the liquid light-curing plastic material is generated on a building platform or on a polymerised layer by guiding a stripping device, which can be coupled to a light source, in a bath of the liquid light-curing plastic material ahead of the illuminated field and/or ahead of the light source; and i) a layer (x1, y1) to be polymerised is obtained as projection surface; and ii) the layer (x1, y1) to be polymerised generated in i) is polymerised as projection surface of the liquid light-curing plastic material using an illuminated field by means of light of the light source in step a), (in particular, i) and ii) are performed simultaneously); and, optionally, b) i) in the region of a reversal point of the pathway of the stripping device or of the light source, in particular a spatially emitting light source, the stripping device is appropriately coupled to the light source such that the light source again guides the stripping device ahead of itself; and, optionally, ii) in step b), the building platform is lowered by one layer thickness (z1) and, optionally, a layer (x, y) of the liquid light-curing plastic material is generated above the previously polymerised layer (x1, y1), and, optionally, c) steps a) and b) are repeated at least one to multiple times.

According to an alternative, the layer (x1, y1) can be produced as follows by a) generating a layer (x, y) of the liquid light-curing plastic material on a building platform or a polymerised layer by appropriately adjusting the amount of the plastic material in a bath of the liquid light-curing plastic material such that the plastic material protrudes vertically at the upper edge of the walls of the container due to the surface tension of the plastic material and forms an arched surface, and, optionally, the plastic material flows into the at least one collecting container arranged on the side of the container, followed by the protruding liquid light-curing plastic material of the arched surface being removed by means of a stripping device, in particular with coupling device, that can be driven along an axis of the container, and a layer (x1, y1) to be polymerised being obtained as projection surface and, optionally, the generated layer (x1, y1) to be polymerised is polymerised as projection surface of the liquid light-curing plastic material using an illuminated field by means of light of a light source, and, optionally, b) the building platform is lowered by a layer thickness (z1) and, optionally, c) steps a) to b) are repeated at least one to multiple times. The building platform serves for adjustment of the z axis for construction of the objects layer-by-layer.

The method can be implemented as a static method. In a static method, the drivable wiper can be driven along an axis of the container. A static light source is used for illumination. However, according to a particularly preferred alternative of the invention, the light source can be driven along an axis of the container and, in addition, can preferably be coupled to the wiper, in particular can be mechanically or magnetically coupled. According to a particularly preferred embodiment variant, steps b) and c) are implemented to be simultaneous. The simultaneous implementation of the formation of the planar surface as projection area and the immediately ensuing illumination can be realised according to the invention by a drivable stripping device and the light source forming an entire assembly 0# that can be coupled, in particular mechanically or magnetically coupled, and driven, i.e. the stripping device and the light source or the assembly 0—small assembly—can be coupled to and uncoupled from each other and form the entire assembly 0#.

Another subject matter of the invention is a method, in which the assembly 0#—entire assembly—comprises a drivable stripping device and an assembly 0—small assembly—, whereby the assembly 0 comprises an arrangement comprising a spatially emitting light source, a spatial light modulator, and the optical system, whereby the optical system, in particular, is a lens system.

It is another advantage of the method according to the invention that the liquid light-curing plastic material can be recycled from the collecting container to the bath. According to the invention, it is preferred for the device to be protected from electromagnetic radiation or to be set up in a dark room.

Moreover, it is preferred to implement the steps of the method such that step b) ii) is performed at the same time as step b) i). Moreover, it is preferred to implement the steps of the method by performing step b) ii) after performing step b) i), or by performing step b) ii) after the drivable stripping device, the light source or the assembly 0# have been guided across the illuminated field and are situated outside of the illuminated field, in particular after performing step a) i) and ii), or after the drivable stripping device, the light source or the assembly 0# have become situated at a front or rear end of the container, in particular in the region of the reversal point. Front and rear shall be understood to mean the regions of the side walls of the container, in which the wiper and the light source have their reversal points. According to the invention, it is preferred to have the regulation of the level of the filling level take place, as in step a), at the reversal points of the illumination process.

According to a preferred embodiment variant, the upper edges of the walls of the container and the lower edge(s) of the stripping device can be situated in the plane of the projection surface.

Moreover, it is preferred for the assembly to comprise, for homogenisation of the distribution of light intensity, a spatial light modulator that comprises a multitude of tiltable micro-mirrors that are arranged in rows and columns and can be triggered, in which the light of a spatially emitting light source is projected by means of an optical system and an illuminated field of the projected light source is guided across a projection surface. Preferably, the projection surface represents the layer (x1, y1), whereby, towards the middle of the illuminated field, an increasing number of pixels is not being illuminated such that a homogenisation of the light intensity of all pixels that are illuminated on the projection surface is attained when integrating over time.

Also a subject matter of the invention is a method, in which the entire assembly 0# or the assembly 0 and thus the illuminated field and the stripping device are simultaneously guided periodically across the projection surface, whereby, preferably, the surface of a liquid light-curing plastic material, in particular the layer (x1, y1), is used as projection surface.

According to a further subject matter of the invention, a rapid prototyping method is claimed, in which a liquid light-curing plastic material is illuminated according to a method described above, preferably is illuminated with UV light, whereby the stripping device is guided simultaneous to and together with the illuminated field, in particular with the light source, the assembly or the entire assembly, and ahead of the illuminated field along an axis (x, y plane) of the container, in particular is guided across the container, in order to form the layer (x1, y1) of the plastic material to be polymerised as projection surface onto which the illuminated field is projected and on which the plastic material polymerises by illumination in the illuminated field.

After the elimination process, the 3-D object thus obtained is cleaned in an alcoholic bath, preferably using isopropanol, and non-polymerised monomer is removed in an ultrasonic bath at 30 to 60° C. Subsequently, the object is tempered in a light furnace. The illumination in the light furnace is done using a wavelength between 300 and 500 nm and, optionally, a thermal treatment is done at 20 to 90° C.

Another subject matter of the invention is the use of a device according to the invention for producing at least parts of dental prosthetic restorations.

The method can just as well be modified such as to use, for producing a homogenised distribution of light intensity, a spatial light modulator that comprises a multitude of tiltable micro-mirrors that are arranged in rows and columns and can be triggered, in which the light of a spatially emitting light source is projected by means of an optical system and an illuminated field of the projected light source is guided across a projection surface with the spatial light modulator, whereby, towards the middle of the illuminated field, an increasing number of pixels is not being illuminated such that a homogenisation of the light intensity of all pixels that are illuminated on the projection surface is attained when integrating over time.

In the scope of the present invention, a pixel shall be understood to mean a smallest light source that can be triggered and from which the image of the data projector is composed.

The DLP® chips of Texas Instruments or Visitech, for example, which are particularly well-suited, can be used as spatial light modulators.

The invention can provide a data projector, preferably a LED data projector, particularly preferably an UV-LED data projector, to be used as spatially emitting light source. Alternatively, a laser system can be used.

Both the data projector and the laser system preferably emit light of a wavelength selected from 180 to 600 nm, more preferably from 230 to 500 nm, particularly preferably from 340 to 500 nm. In general, all polychromatic light sources can be used as data projector, whereby monochromatic light sources or essentially monochromatic light sources are particularly preferred though. The use of monochromatic light sources allows the light intensity and/or the radiation intensity to be made more uniform and thus a more homogeneous polymerisation to be attained. LED-UV data projectors with a wavelength of about 385 nm or laser systems with a laser with a wavelength of approx. 285 nm are particularly preferred. Data projectors with a resolution of more than or equal to 1024×800, preferably more than or equal to 1920×1080 pixels, in particular high-resolution of up to 100,000 or more pixels are preferred. It is particularly preferred to use spatially emitting light sources with coherent rays of light. Spatial coherence is also attained through a very small distance between the light source 1 and/or assembly 0 and the illuminated field 5.

A small distance between the spatial light source, arrangement and/or assembly and the illuminated field shall be defined as 3 mm to 500 mm, in particular 3 mm to 250 mm, particularly preferably 3 mm to 150 mm, preferably 3 mm to 50 mm, alternatively the distance can just as well be 1 mm to 50 mm. According to the invention, the spatially emitting light source, the spatial light modulator, and the optical system, in particular a lens system, form an arrangement. Moreover, the spatially emitting light source, the spatial light modulator, and the optical system, in particular a lens system, are provided as an arrangement in an assembly.

In this context, the invention can provide for a mask stored for triggering the data projector, in particular a programmable mask, to define the non-illuminated pixels in that certain light points of the data projector remain switched off at all times. A mask according to the invention corresponds to a motif of the switched-off light points of the light source, whereby the motif shows up in the illuminated field as non-illuminated pixels, in particular as a static motif of non-illuminated pixels.

Using the stored mask, it becomes very easy to reduce the light intensity in certain areas of the illuminated field. Using said mask, a homogenisation of the illuminated field, in particular a homogenisation of the light intensity of the illuminated field, particularly preferably a homogenisation in the time integral of the light intensity of the illuminated field, can be attained.

As an alternative to the use of a stored mask, the invention can just as well provide the non-illuminated pixels to be defined by blackening of the micro-mirrors or through a spatial light modulator with voids in the micro-mirror configuration or through deflection of the light points by the micro-mirrors.

Omitting individual micro-mirrors can reduce the costs of the spatial light modulator and/or the requisite number of connections. If blackening is used, commercially available fully-configured spatial light modulators can be used.

A refinement of the method according to the invention can just as well provide the number of non-illuminated pixels to increase towards the middle according to a function, preferably linearly or according to a parabola, particularly preferably according to a function that takes into account the interferences that are present, preferably according to a function that improves the coherence of the illuminated field, preferably of the motif to be illuminated and/or printed.

As a result, the deviations in the intensity of the illuminated field, which typically occur due to the optical system, can be compensated for particularly well. A function as specified compensates particularly well for the increase in intensity in the middle of the illuminated field.

In this context, the invention can provide the function to be determined, preferably calculated, depending on the inhomogeneity of the illuminated field caused by the optical system, in particular a lens system.

Preferably, the function is determined, preferably calculated, depending on the inhomogeneity of the illuminated field caused by the spatial light source, the arrangement comprising the spatial light source, the spatial light modulator and/or the optical system. Alternatively, the function is calculated depending on the inhomogeneity caused by the assembly comprising the light source.

The function according to which the number of non-illuminated pixels increases towards the middle of the illuminated field is determined as function of a reference 1, which indicates the original light intensity of the light source in the illuminated field on the projection surface (plane), and correlates it to reference 2, which indicates the homogeneous, spatial light intensity (energy density in the plane, averaged over x pixels) of the projection surface, in particular over 12×13 to 1920×1080 pixels. The projection surface can just as well comprise a higher resolution of pixels.

This measure also serves to provide for accurate compensation of the construction-related errors in the intensity distribution and to thus generate an illuminated field that is as homogeneous as possible.

According to a particularly preferred embodiment of the method according to the invention, the invention can just as well provide the intensity distribution of the illuminated field to be measured or calculated at maximal illumination by the light source and the spatial light modulator, and the number of non-illuminated pixels in each row and/or column to be determine therefrom.

This provides a particularly well-suited method that allows even specific intensity deviations of certain light sources, such as types of data projectors or individual data projectors, to be compensated by simple means.

According to a preferred embodiment, the invention can provide the spatially emitting light source, preferably the arrangement comprising the spatially emitting light source and/or the assembly comprising a spatially emitting light source, to be guided across the projection surface in order to guide the illuminated field of the projected light source across the projection surface, whereby the illuminated field can be guided back-and-forth across the projection surface.

This can take place in continuous or discontinuous manner. Preferably, the assembly is periodically guided across the projection surface.

As a result, a method that is particularly easy to implement is provided to implement the method in rapid prototyping. Said method is less error-prone than other methods, in particular those, in which only the illuminated field is guided across the projection surface.

A refinement of the method according to the invention proposes to periodically guide the illuminated field across the projection surface. Periodic sweeping across the projection surface attains a more uniform intensity along the direction of motion of the illuminated field.

The illuminating single images of the motif are obtained by a superimposition a) of the extracted single images of the motif, i.e. derived from the motif to be printed shown as single motifs in the scrolling process and/or guidance of the arrangement comprising the light source across the projection surface with b) the motif of the switched-off light points or the motif of the mask. The light intensity of the illuminating single images of the motif is homogenised as compared to illumination without spatial light modulator or mask.

According to a particularly preferred embodiment variant, the method involves generating illuminated single images of the motif in the illuminated field through a superimposition a) of extracted single images of the motif and b) the motif of the switched-off light points. The extracted single images of the motif correspond to the motif to be printed that has been decomposed into single images of the motif for the scrolling process (FIG. 7b).

The motif of the switched-off light points (FIG. 7c) shows the non-illuminated pixels, the static motif of non-illuminated pixels. The illuminating single images of the motif (FIG. 7d) are obtained through a superimposition of the corresponding single images of the motif (extracted single images of the motif, FIG. 7b) and the static motif of the switched-off light points, shown as static motif with non-illuminated pixels.

The motif to be printed is obtained by guiding the illuminated field with the illuminated single images of the motif across the projection surface.

The invention can just as well provide for the surface of a liquid light-curing plastic material to be used as projection surface. In particular, a light-curing dental material is used as light-curing plastic material. According to the invention, the initiator system of the light-curing plastic material and the wavelength of the light source are matched optimally to each other.

A light-curing plastic material shall be understood to be a resin or, preferably, a mixture of light-curing monomers comprising, optionally, photoinitiators or a photoinitiator system. It is particularly preferred to use dental light-curing plastic materials in the method according to the invention. The dental light-curing plastic materials can further comprise filling agents and usually comprise alkyl(meth)acrylates. Using a liquid light-curing plastic material as projection surface, the method is well-suited for producing three-dimensional form bodies (synonym: objects) (as so-called rapid prototyping method). The underlying objects of the invention are also met by a rapid prototyping method, in which a liquid light-curing plastic material is illuminated by means of a method of this type, preferably is illuminated by UV light, whereby the illuminated field is projected onto the surface of the plastic material and the plastic material is cured through the illumination of the illuminated field.

The method according to the invention for homogenising the light intensity of the illuminated field has a particular impact on rapid prototyping methods, since the objects and/or plastic bodies thus made can be built-up homogeneously.

The invention is based on the surprising finding that the use of dead and/or permanently black pixels, i.e. non-luminous pixels, allows a homogenisation of the UV light intensity to be attained without having to adjust grey values with the spatial light source for this purpose. A previously defined mask, which is stored in a data projector, preferably an UV data projector, can be used in this context. The number of pixels defined to be black in the rows and/or columns, i.e. non-luminous pixels, increases towards the middle of the illuminated field in order to compensate for the optical system-related attenuation in intensity of the illuminated field towards the periphery. This is necessary since the middle rows (and/or columns) are illuminated more brightly for constructive reasons (due to the optical system).

The effect of the method according to the invention is as follows. The motion of the data projector and/or of the radiation originating from the data projector causes the entire row of the illuminated field to be triggered during an illumination. As a result, a maximal light intensity (amount of UV light) is generated during the sweep. In an illuminated field consisting of, for example, 1920×1080 pixels, the maximal light intensity of 1080 pixels would be generated. If fewer pixels are triggered, both the power and/or the time integral of the light intensity is/are reduced. According to the invention, the uneven illumination by the optical system is compensated by this means.

Another subject matter of the invention is a computer-readable medium on which a computer program for use of a device according to the invention is stored, which, when executed by a microprocessor, is made operable in order to be able to implement the method according to the invention as illustrated above.

Another subject matter of the invention is a program element for controlling the device according to the invention which, when executed by a microprocessor, is made operable in order to be able to implement the preceding method according to the invention.

Exemplary embodiments of the invention shall be illustrated in the following on the basis of schematic figures, though without limiting the scope of the invention. In the figures:

FIG. 1: shows a device according to the invention having an arched surface 21a made of the polymerisable plastic material.

Figure 2:
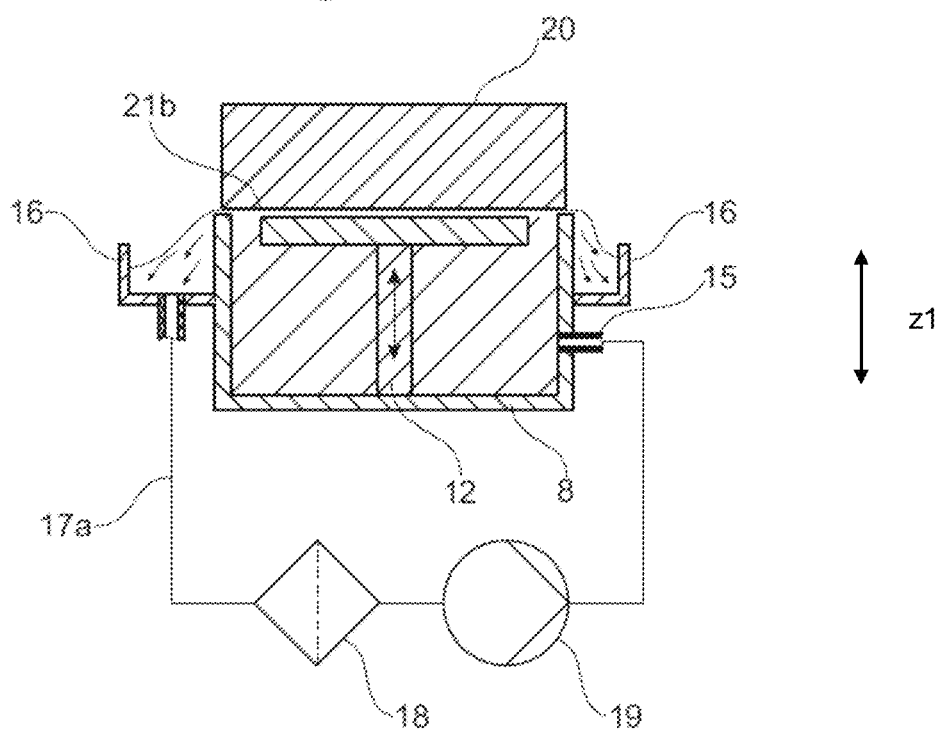

FIG. 2: shows a device according to the invention having a planar surface 21b made of the polymerisable plastic material.

Figure 3:
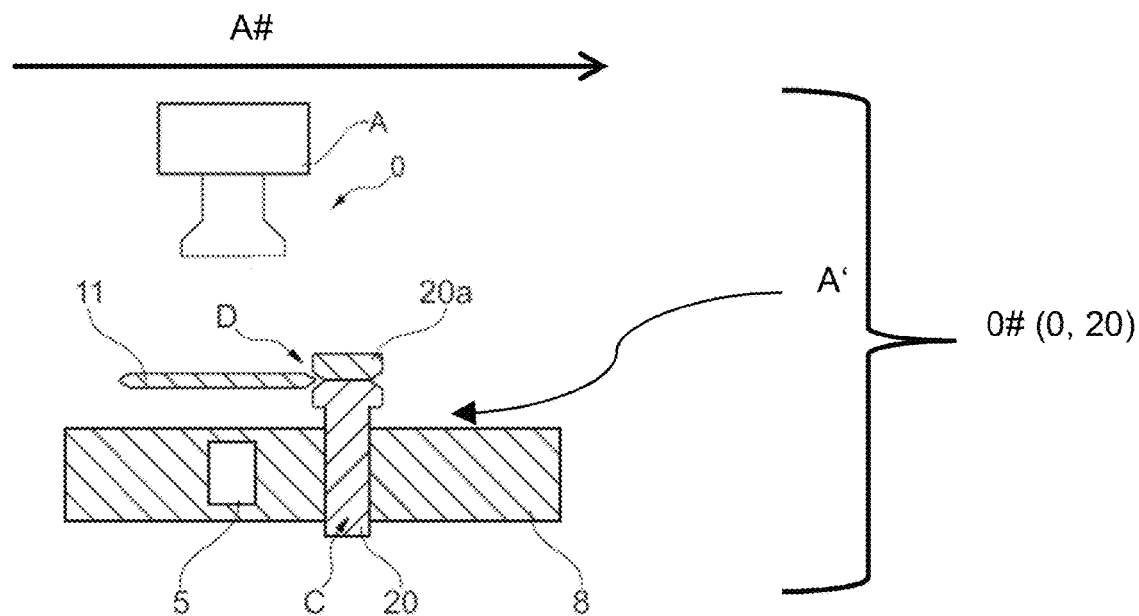
Figure 3:
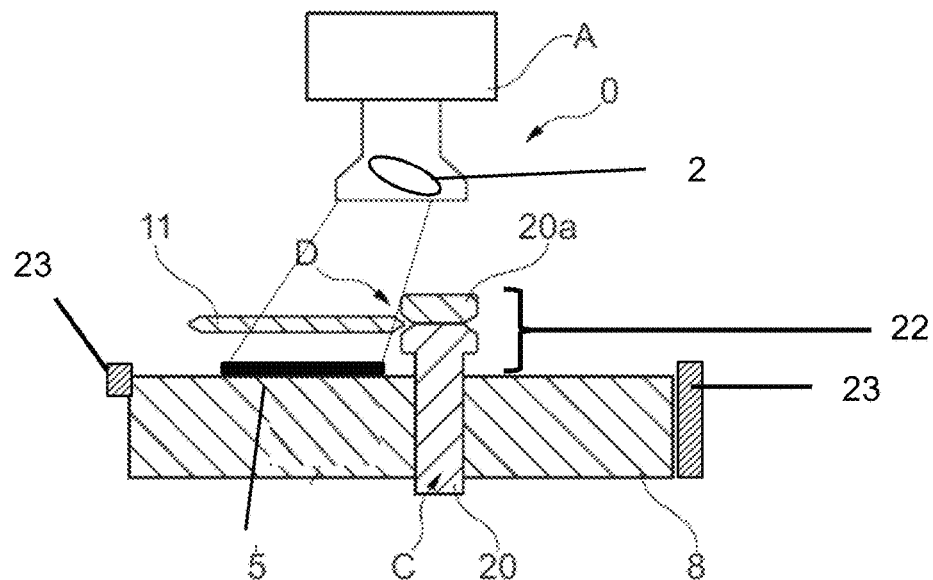
Figure 4:
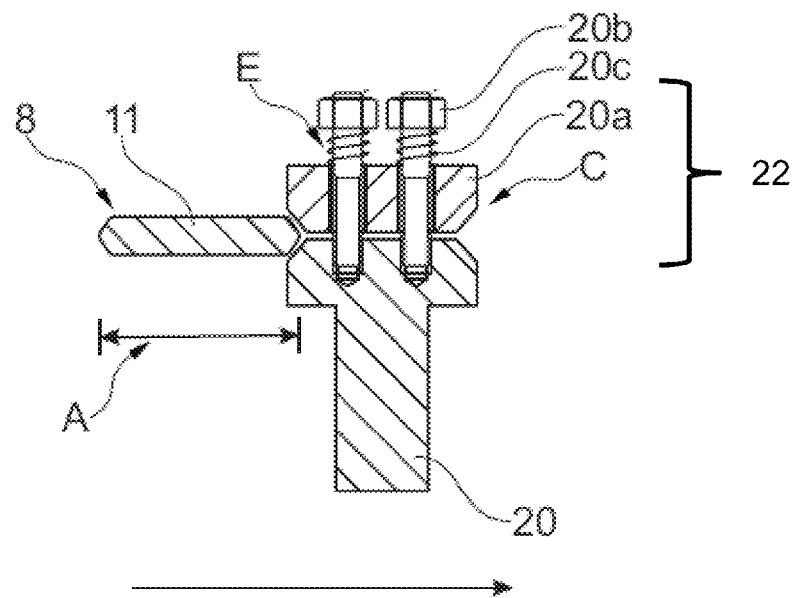

FIGS. 3a, 3b, and 4: show a coupling device and coupling element.

Figure 5:
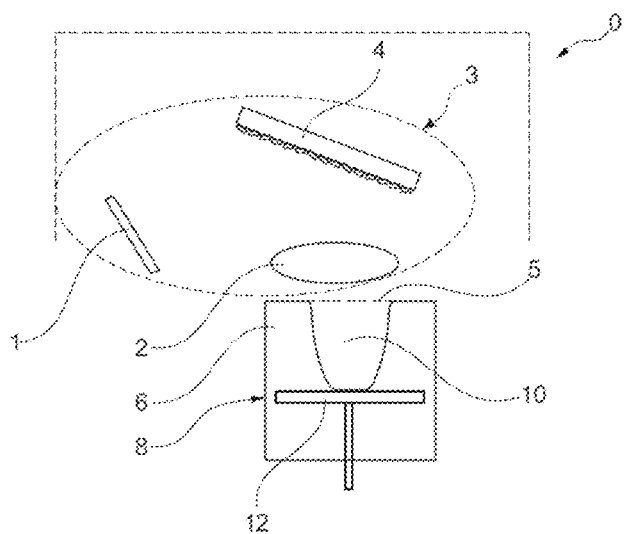
Figures 6A, 6B:
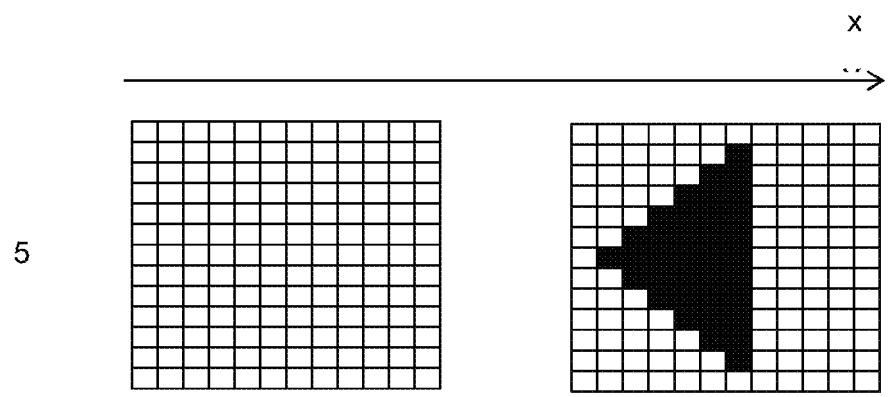

FIG. 5: shows a cross-sectional view of a schematic set-up for implementation of a method according to the invention; and FIG. 6: shows a schematic comparison of a fully illuminated UV data projector chip according to the prior art (FIG. 6A) and a UV data projector chip operated according to the invention (FIG. 6B).

Figure 7A:
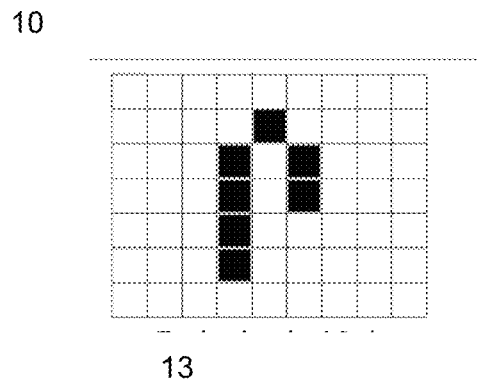
Figure 7B:
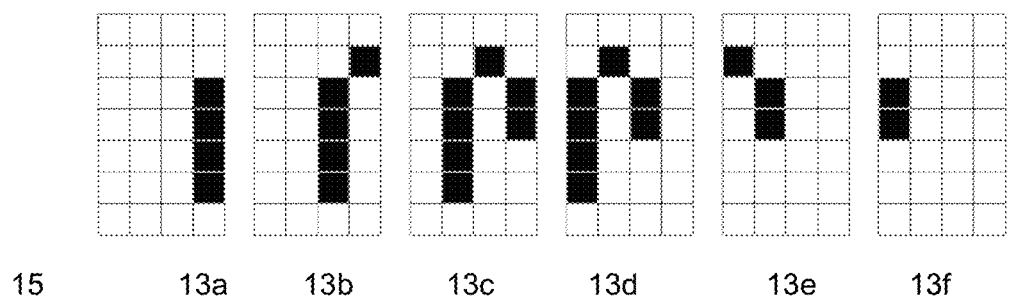
Figure 7C:
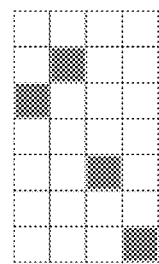

FIG. 7a: shows a motif to be printed (13), whereby the light points are shown as black pixels;

FIG. 7b: shows the images that are projected individually by the light source (1) of the data projector (extracted single images of motif 13a, 13b, 13c, 13d, 13e, 13f) for generation of the motif to be printed (13) during the motion of the light source across the projection surface (with no mask), whereby the light points are shown as black pixels;

FIG. 7c: shows a motif of the switched-off light points (14) generated by means of a mask or by switched-off light points generated by the spatial light modulator for compensation of illumination differences, whereby the switched-off light points are shown as grey pixels;

FIG. 7d: shows an addition and/or superimposition of the motif of the switched-off light points (14) generated by the spatial light modulator and/or the mask and the extracted single images of the motif (13a to 13f), whereby the mask with the switched-off light points (14) is shown as grey pixels and the light points are shown as black pixels. The motif of the switched-off light points (14, negative motif) shown as grey pixels is shown statically in all single images of the motif as superimposition and/or subtraction, i.e. of the motif of the permanently faded-out or switched-off light points (14) of the single images of the motif (13a to 13f) of the motif to be printed (13) and shown as superimposition in the single images of the motif to be illuminated (14a, 14b, 14c, 14d, 14e, 14f).

Figure 8:
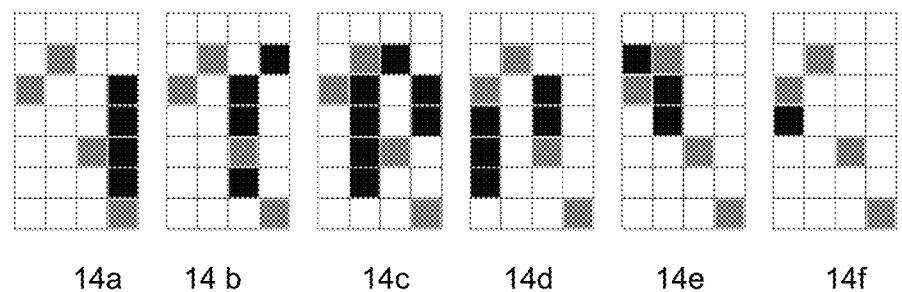
Figure 8:
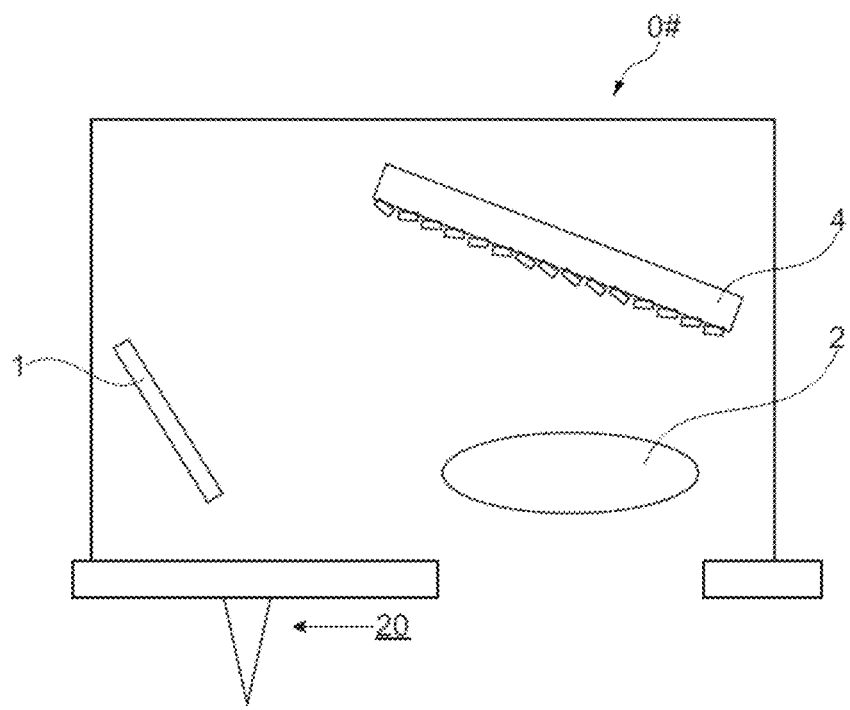

FIG. 8: shows the entire assembly (0#) comprising a stripping device (20) that can be coupled to and uncoupled from the assembly (0).

The inventive "Illumination process and procedure of the stereolithography process" involves the regulation of the level of the filling level in the reversal points of the illumination process. During the period of time, in which the illumination unit (assembly 0, entire assembly 0#, FIG. 8) is being decelerated and then accelerated again, the hose pump 19 (FIG. 1, 2) pumps a sufficient amount of resin (polymerisable plastic material, composition comprising monomers) into the container 8. Said amount must be selected appropriately such that a sufficient amount of resin is built up beyond the wall 8a of the container 8. This forms the arched surface 21a (FIG. 1). Due to the surface tension of the resin and/or plastic material, said elevated amount of material is retained until the scraper (stripping device 20) wipes it off and smoothes the surface. The layer (x1, y1) with the projection surface has been formed (FIG. 2).

Subsequently, the illumination unit (assembly 0, 0#) is being driven and pushes the scraper across the surface and smoothes the surface 21b by wiping off the excess of material. The material leaking over the wall 8a (FIG. 2) is collected in the collecting container (FIG. 2) and is returned to the pump cycle (FIGS. 1 and 2) through a suction opening with a suction line 17a. This ensures that the level always remains constant during the construction process and/or illumination phase.

The building platform 12 (FIGS. 1 and 2) is lowered by one layer thickness (z1) and the process commences again.

The horizontal positions of the container 8 and of the scraper 20 do not change during the construction phase and/or method. Said positions are adjusted once and then remain unchanged. The vertical distance with respect to each other is adjusted and aligned by a defined value (this value is 0.1 mm in the first test). The distance mainly serves to maintain a mechanical and vibration-free separation of the two systems (illumination system (assembly, stripping device)=in motion/container system=static). The distance should not be larger than the height that can be attained by the liquid through surface tension. Preferably, the distance is the same or somewhat smaller.

The wiped-off light-curing plastic material is suctioned into the cycle by means of a suction line 17a and a suction pump 19 (FIG. 1 or 2) and preferably filtered (Filter 18) and returned to the container 8 (trough). The system is tight in order to prevent the ingress of air into the cycle. Inclusions of air interfere with the polymerisation and/or construction process and lessen the quality of the form body/object.

FIG. 3a (non-perspective, schematic) and 4 schematically show the coupling device 22 between the assembly 0 or the light source 1 and the stripping device (scraper) 20. According to FIGS. 3a, 3b, and 4, a coupling element 11, such as a sword, is assigned to the light source 1 or the assembly 0 by means of which these can push the stripping device 20 ahead of them by means of the coupling device 22. Arranged in front of the illuminated field 5 of the light source 1, the stripping device is pushed ahead of the illuminated field 5 in the method. The coupling element 11 can be assigned to the assembly on the side of the container or bath, for example the coupling element 11 is connected to the assembly 0 by means of an arm (not shown). For this reason, the coupling element 11 of FIGS. 3a and b is arranged on the side and behind the container rather than above the bath 7 such that the light source 1 (not shown) can reflect an illuminated field 5 on the plastic material 6 in the assembly. The coupling device 22 is provided on the top part of the stripping device and comprises at least one element 20a that is connected to the upper end of the stripping device, which can just as well be present as element 20a, by means of an elastic element, such as a spring mechanism 20c and a fixation 20. An attenuator 23 (FIG. 3b) that decelerates the stripping device 20 can be assigned to the sword 11 in the region of the reversal point of the container. The sword of the assembly 0 or of the light source 1 is then pushed into the recess A between the two elements 20a. Once a certain pressure is reached, the sword pushes the two elements 20a apart and glides through between these elements. The elements 20a are pressed against each other again by the elastic elements 20c. When the direction is changed subsequently (reversal point), the sword again pushes the stripping device ahead of itself across the container. When, in the method according to the invention, the illumination unit/assembly 0, 0# with UV data projector 1 (UV-LED data projector; in assembly 0, 0#) is driven across the surface 21a, 21b symmetrically to the container 8 and at a defined distance and when the illuminated field 5 is guided, preferably horizontally, across the projection surface thus formed, the scraper 20 (stripping device) for smoothing the surface is automatically guided along ahead of the light source 1 or ahead of the illuminated field 5 (drag method). In this embodiment variant, the scraper is connected neither mechanically nor electrically, but simply touches the illumination unit. The scraper is pushed ahead of the illumination unit (assembly 0) or the illuminated field 5 at a distance of 20 to 150 mm. At the start of the illumination process, the illumination unit slowly drives toward the stripping device (scraper) until it contacts the device. Subsequently, the illumination unit accelerates to process speed and pushes the scraper ahead of itself. The illumination step follows next. On the opposite side of the container, the scraper is stopped by an attenuator while the illumination unit drives on. The attenuator builds up pressure until the sword of the illumination unit slips through the coupling device of the scraper once the springs 20c allow the sword to glide through between the plates 20a. The plates 20a and springs 20c are arranged by means of stud bolts 20b. After the illumination unit travelled through said reversal point, the scraper is again positioned on the opposite side of the illumination unit in front of the illumination field 5 and now pushes it back to the starting point accordingly. By this means, two layers can be polymerised. The three-dimensional objects are built up by repeating these cycles. It was possible to significantly reduce the process time by coupling the stripping device to the light source or the assembly 0 and thus to the illuminated field. FIG. 3b shows the illuminated field 5 on top of the plastic material in the container 8. The illuminated field 5 can be projected onto the protection surface by means of a lens 2.

FIG. 5 shows a schematic cross-sectional view of a set-up for implementing a method according to the invention. An UV-LED data projector 1 emitting ultraviolet light (UV light) is made to emit at a spatial light modulator 4. The UV-LED data projector 1 has a resolution of 1920×1080 pixels that emit as a rectangular area on the surface of a chip of the UV-LED data projector 1. The spatial light modulator 4 comprises a multitude of micro-mirrors that can be triggered and by means of which the light from the UV-LED data projector 1 is reflected and projected onto the surface of a liquid light-curing plastic material 6 by means of a lens system 2. The micro-mirrors are shown in FIG. 1 as small rectangles, differing in orientation, on a surface of the spatial light modulator 4. The liquid plastic material 6 is arranged in a container 8 that is open in an upward direction toward the spatial light modulator 4 and/or the lens system 2. Shown schematically as a simple lens in FIG. 5, the lens system 2 projects the area of the pixels of the UV-LED data projector 1 onto the surface of the light-curing plastic material 6. Using a suitable motor (not shown), the UV-LED data projector 1 is moved across the container 8 and thus the illuminated field is swept across the surface of the light-curing plastic material 6 such that each row of the chip of the UV-LED data projector 1 travels or can travel fully across any point to be illuminated.

The illuminated field thus generated on the surface of the light-curing plastic material 6 cures the liquid components such that a solid plastic body 10 arises. The solid plastic body 10 is supported as in a bearing on a mounting 12, which is slowly being lowered such that the upper surface of the plastic body 10 is wetted by the liquid light-curing plastic material 6 and a new solid layer can be generated on the plastic body 10 by means of the illuminated field. For details regarding the implementation, reference shall be made to EP 1 880 830 A1 or EP 1 894 705 A2.

A homogenisation of the illuminated field and therefore of the plastic body 10 thus generated is attained in that the pixels arranged in the middle of the UV-LED data projector 1 are not used, i.e. in that they remain black. For clarity, a use according to the invention and/or a triggering according to the invention of a chip of this type is shown in FIG. 2B and shall be explained in the following.

FIG. 6 shows a schematic comparison of a fully illuminated UV data projector chip according to the prior art (FIG. 2A) as compared to a UV data projector chip operated according to the invention (FIG. 6B). The UV-LED chip shown for exemplary purposes has only 12×13 pixels to allow the underlying principle of the present invention to be illustrated easily. In a real embodiment, UV-LED data projectors of significantly higher resolution are used, for example 1920×1080 pixels.

Each of the UV-LED chips has 12 columns and 13 rows. In the fully illuminated UV-LED chip according to the prior art (FIG. 6A), the inner areas of the illuminated field are illuminated with a higher UV intensity than the outer areas. As a result, the highest intensity is produced in the middle column and the intensity decreases towards the outside. Due to scattering effects and other phenomena related to the optical system, the individual pixels of the UV-LED data projector cannot be projected at any desired image sharpness. Accordingly, each pixel also illuminates the areas of the illuminated field that should be illuminated by its neighbouring pixels. As a result, areas of the illuminated field illuminated by the inner pixels receive a higher intensity than the areas of the illuminated field illuminated by the outer pixels.

This is compensated with respect to the columns (from top to bottom in FIG. 6) in that the UV-LED data projector is driven across the illuminated field along a direction of motion X. The direction of motion X of the UV-LED data projector and/or of the illuminated field is indicated by the arrow in FIGS. 6A and 6B. Accordingly, the image emitted by the UV-LED chips is being moved across the illuminated field in the direction of the rows (from left to right in FIG. 6, i.e. along the arrow X). A DLP® chip made by Texas Instruments can be used for projection.

The black pixels shown in FIG. 6B, which remain switched-off or are not reflected onto the surface of the liquid light-curing plastic material by the spatial light modulator, progressively reduce the light intensity towards the middle in the different columns of the UV-LED data projector operated according to the invention. As a result, the middle areas of the illuminated field swept along the direction of motion X receive the same intensity of ultraviolet radiation as the outer areas (rows).

The simplest embodiment of a method according to the invention can be implemented by storing a mask for the data projector that defines which of the pixels are not switched-on and/or used and thus remain black. Alternatively, a spatial light modulator that comprises fewer or blackened mirrors in the middle can be used just as well.

In FIG. 6B, only the outermost two rows are irradiated by all twelve pixels, whereas one pixel less lights up and/or is projected for each row closer to the middle row. In the middle row, only six pixels are active and/or only six pixels are projected. Sweeping across the illuminated area along the direction of motion X, a mean illumination intensity is generated at the illuminated points of the illuminated field and the mean illumination intensity is directly proportional to the number of pixels of the UV-LED data projector that are used and/or projected. Suitable data projectors can have a resolution of up to 100,000 or up to 1.5 million pixels. Just as well, data projectors projecting in XGA and super-XGA (SXGA) resolution of 1.280×1.024 pixels can be used.

In order to attain a uniformly homogenised distribution of light intensity on the surface of the light-curing plastic material and/or of the projection surface, the illuminated field is guided across a building platform at a constant velocity. Presently, the building platform is 1,920×20,000 pixels in size (pixel size presently is 50×50 µm). During the motion, image details are constantly reproduced via the illuminated field.

Once it is defined, the mask stored in the UV data projector generates dead (permanently black) pixels in the individual rows. In this case, the number of pixels in the rows defined to be black increases towards the middle, since the rows in the middle are illuminated more brightly for constructive reasons (due to the optical system).

The effect is as follows: Due to the motion of the UV data projector, the entire row of the illuminated field is triggered during an illumination. As a result, a maximal amount of UV light of 1080 pixels is generated during the sweep. If fewer pixels are triggered, the power is reduced and the uneven illumination of the optical system can be balanced.

FIG. 7a shows a motif 13 to be printed, in which the light points are shown as black pixels. FIG. 7b shows the sequence of images that are projected individually by the light source (extracted single images of the motif 13a, 13b, 13c, 13d, 13e, 13f) for generation of the motif 13 to be printed during the motion of the light source or of the arrangement across the projection surface (without motif of the switched-off light points and/or with no mask). The light points are shown as black pixels. FIG. 7c shows the motif of the switched-off light points 14. The motif of the switched-off light points is generated by the spatial light modulator and/or the mask. The switched-off light points are shown as grey pixels. In this manner, light points can be switched-off or deflected by the spatial light modulator in order to balance out differences in illumination.

FIG. 7d shows the superimposition of the motif of the switched-off light points 14, in particular of the static motif, generated by the spatial light modulator and/or the mask and the extracted single images of the motif 13a to 13f. The motif of the switched-off light points 14 or the mask are shown as grey pixels. The illuminated pixels in the illuminated field are shown as black pixels and form the single images of the motif to be illuminated (14a, 14b, 14c, 14d, 14e, 14f).

FIG. 8 shows the entire assembly 0# comprising a stripping device 20 that can be coupled to and uncoupled from the assembly 0. For polymerisation of the plastic material 6, the light source 1 or at least the illuminated field 5 of the light source 1 is guided ahead of the entire assembly 0# or the assembly 0 behind the stripping device 20. The stripping device 20 can be mechanically coupled, in particular by means of the coupling device 22, to the light source 1 or to the illuminated field 5 of the light source 1 and is guided ahead of the light source 1 or the illuminated field 5.

The features of the invention disclosed in the preceding description and in the claims, figures, and exemplary embodiments, can be essential for the implementation of the various embodiments of the invention both alone and in any combination.

REFERENCE NUMBERS

0 Assembly comprising light source (1) and/or (A), such as UV-LED data projector (1) or laser system, optical system, in particular lens system (2), spatial light modulator (4); 0# entire assembly and/or entire assembly comprising stripping device 20 and assembly 0 comprising light source 1, such as UV-LED data projector 1 or laser system, optical system, in particular lens system 2, spatial light modulator 4, whereby the stripping device can be coupled to or uncoupled from the assembly 0.

1 UV-LED data projector, 2 lens system; 3 arrangement of the spatial light source 1, spatial light modulator 4 and/or lens system/optical system 2; 4 spatial light modulator; 5 illuminated field; 6 light-curing liquid plastic material, in particular mixture comprising monomers, composition comprising dental monomers; 7 bath; 8 container; 10 cured light-curing plastic material/plastic body; 11 coupling element such as sword with the sword preferably having a geometry that is matched to the coupling device and/or recess A', 12 mounting, building platform;

13 motif to be printed, 13a to 13f images projected individually (13a, 13b, 13c, 13d, 13e, 13f) for generation of the motif to be printed; 14 motif of the switched-off light points/motive non-illuminated pixels, 14a to 14f single images of motive to be illuminated having a homogenised distribution of light intensity. Images projected individually (14a, 14b, 14c, 14d, 14e, 14f) for generating the motif to be printed 13, shown as individually projected images (13a, 13b, 13c, 13d, 13e, 13f) for generating the motif to be printed during scrolling with a static superimposition of the motif of the switched-off light points (14)

15 feeding device; 16 collecting container; 17 pipeline, 17a suction line, 17b feed line; 18 filter, 19 pump, in particular hose pump; 20 (C) stripping device, scraper; 20a element, in particular plate; 20b fixation, in particular screw; 20c elastic element, in particular spring mechanism (E); 21a surface of bath during overflow of plastic into collecting container; 21b surface of bath corresponding to illumination or after adjustment of the surface by stripping device, in particular planar surface, scraper; 22 coupling device, A' recess, 23 attenuator; A # direction of motion; D drag method, E compression springs retained by stud bolts, z1: layer thickness; x,y; x1,y1: layer as plane

The invention claimed is:

1. Device comprising an assembly with a light source, for production of a three-dimensional object by illuminating a liquid light-curing plastic material, having a container for accommodation of a bath of the light-curing liquid plastic material comprising: a building platform for positioning the object relative to the surface of the bath, wherein the light source and a stripping device are coupleable and in that the stripping device is arranged in front of the light source and/or in front of an illuminated field; and wherein at least one collecting container is assigned to the container; wherein the liquid light-curing plastic material leaking over a wall of the container is collected in the at least one collecting container and is returned to a pump cycle through a suction opening with a suction line; wherein the assembly serves for producing a homogenised distribution of light intensity and comprises an arrangement that comprises a spatially emitting light source, a spatial light modulator, and an optical system, with a lens system; wherein the spatial light modulator comprises a multitude of micro-mirrors that can be triggered and by which the light from the spatially emitting light source is reflected and projected onto the surface of a liquid light-curing plastic material by the lens system; wherein light points are switched off or deflected by the spatial light modulator; wherein the number of non-luminous pixels increases towards the middle of the illuminated field in order to compensate for an optical system-related attenuation in intensity of the illuminated field towards the periphery; whereby the stripping device comprises a coupling device, and a coupling element is assigned to the light source or the assembly and a coupling device is assigned to the light source or the assembly; wherein the coupling element engages the coupling device in detachable manner and in that the coupling element is formed to be form-fitting with the coupling device, and in that the coupling element is coupleable to the coupling device in detachable manner in force-locking, electrical or magnetic manner.

2. Device according to claim 1, wherein the coupling device comprises first and second elements, wherein the upper end of the stripping device is formed as the second element, whereby said first and second elements are attached to each other by at least one elastic element and at least one fixation element, and, optionally, the coupling element engages the first and second elements laterally in form-fitting manner and is guided through, with a defined force, between the first and second elements in force-locking manner.

3. Device according to claim 2, wherein the device has an attenuator that triggers a guiding-through or sliding-through of the coupling element between the first and second elements of the coupling device.

4. Device according to claim 1, wherein the lens system is the optical system.

5. Device according to claim 1, wherein the liquid light-curing plastic material, optionally plastic material protruding above the container and having an arched surface, can be transferred into the at least one collecting container by the stripping device, wherein the stripping device is driven along an axis of the container.

6. Device according to claim 1, wherein the drivable stripping device is guided directly along an axis of the container by the drive or propulsion of the light source, assembly or entire assembly.

* * * * *